United States Patent
Schulz

[19]

[11] Patent Number: 6,012,449
[45] Date of Patent: Jan. 11, 2000

[54] OUTER WALL ELEMENT FOR BUILDINGS

[75] Inventor: Harald Schulz, Krumbach, Germany

[73] Assignee: Norsk Hydro A.S., Olso, Nauru

[21] Appl. No.: 08/875,486

[22] PCT Filed: Nov. 4, 1995

[86] PCT No.: PCT/DE95/01550

§ 371 Date: Jul. 8, 1997

§ 102(e) Date: Jul. 8, 1997

[87] PCT Pub. No.: WO96/32550

PCT Pub. Date: Oct. 17, 1996

[30] Foreign Application Priority Data

Apr. 8, 1995 [DE] Germany .......................... 195 13 373

[51] Int. Cl.[7] .................. E04D 13/18; F24J 2/46
[52] U.S. Cl. .................. 126/621; 126/623; 126/704; 126/706; 126/709; 52/222
[58] Field of Search .................. 126/621, 623, 126/704, 706, 709; 52/222

[56] References Cited

U.S. PATENT DOCUMENTS

| | | | |
|---|---|---|---|
| 3,937,208 | 2/1976 | Katz et al. | 126/623 |
| 4,063,544 | 12/1977 | Bowen | 126/623 |
| 4,112,921 | 9/1978 | MacCracken | 126/706 |
| 4,138,991 | 2/1979 | Lorenz | 126/706 |
| 4,143,641 | 3/1979 | Christopher | 126/623 |
| 4,178,909 | 12/1979 | Goolsby et al. | 126/707 |
| 4,215,677 | 8/1980 | Erickson | 126/621 |
| 4,269,173 | 5/1981 | Krueger et al. | 126/623 |
| 4,271,826 | 6/1981 | Duchene | 126/623 |
| 4,278,072 | 7/1981 | Ryan et al. | 126/623 |
| 4,296,742 | 10/1981 | Hussmann | 126/706 |
| 4,305,384 | 12/1981 | Proven | 126/621 |
| 4,313,429 | 2/1982 | McAlaster | 126/621 |

FOREIGN PATENT DOCUMENTS

| | | |
|---|---|---|
| 2 626 028 A1 | 7/1989 | France . |
| 42 36 603 A1 | 5/1993 | Germany . |

*Primary Examiner*—Ira S. Lazarus
*Assistant Examiner*—David Lee
*Attorney, Agent, or Firm*—Herbert Dubno

[57] ABSTRACT

An outer wall element for buildings wherein, between the inner wall shell and a solar-radiation permeable outer wall shell, a solar-radiation permeable and heat-insulating layer is arranged, the latter being separated from an inner heat-insulating layer of the inner wall shell by an interface that absorbs the solar radiation from the outer heat-insulating layer. At least the inner wall shell is provided with marginal lining elements, which can be parts of a frame, panels or the like, extending at least up to the interface and conveying heat to the inner wall side. In order to protect the lining elements from the high temperatures reached in the outer heat-insulating layer because of the use of solar energy, the outer heat-insulating layer and the lining elements are separated from each other by insulating elements with poor heat conductivity, which starting from the lining elements cover the inner heat-insulating layer along a marginal strip in the interface.

10 Claims, 6 Drawing Sheets

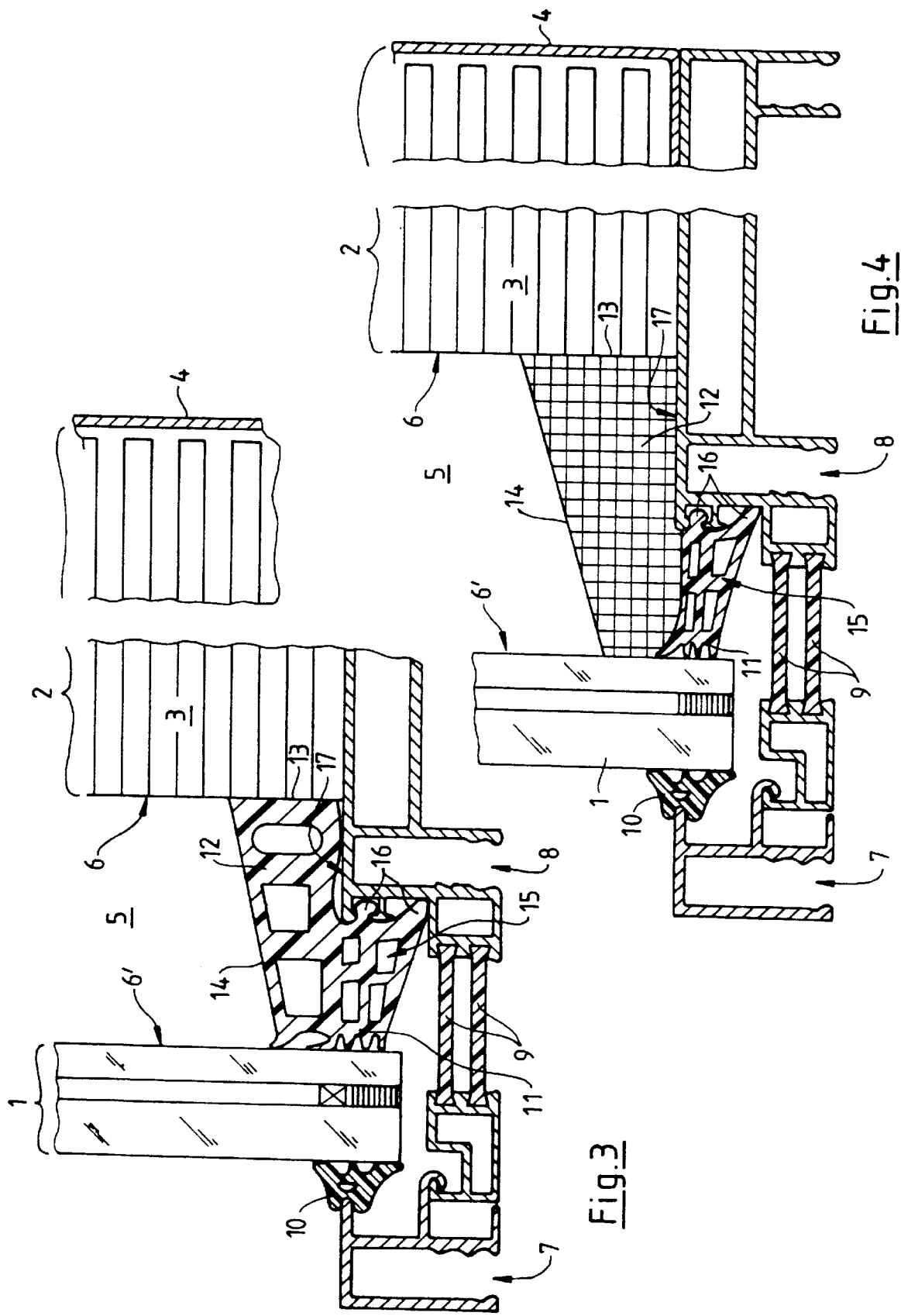

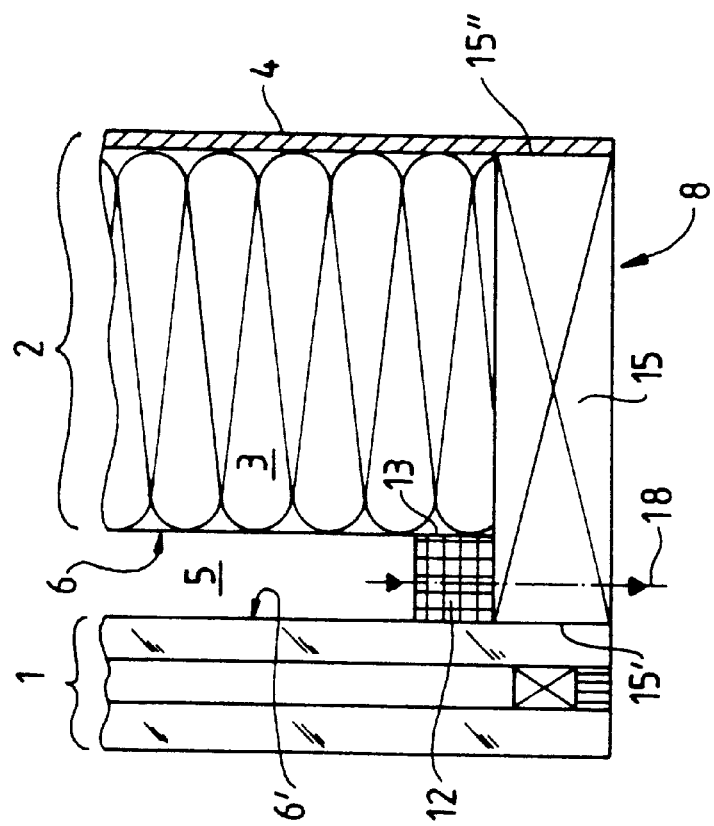
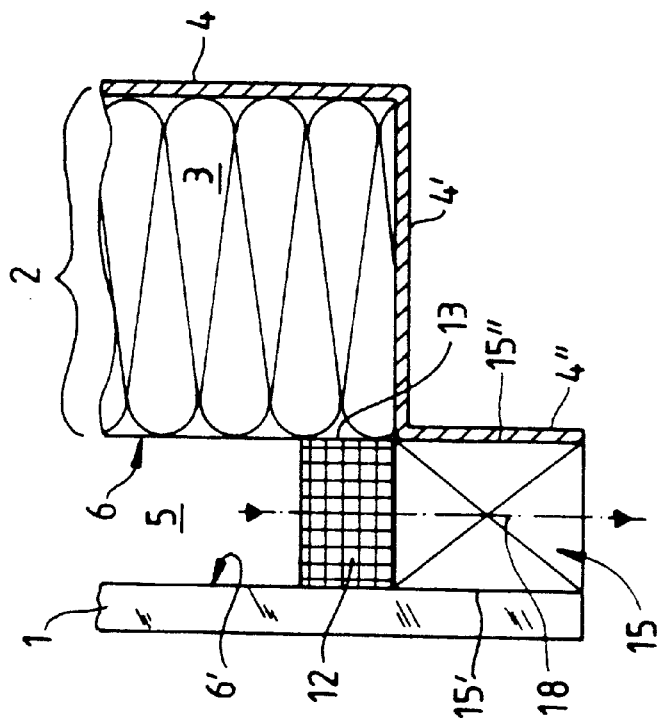

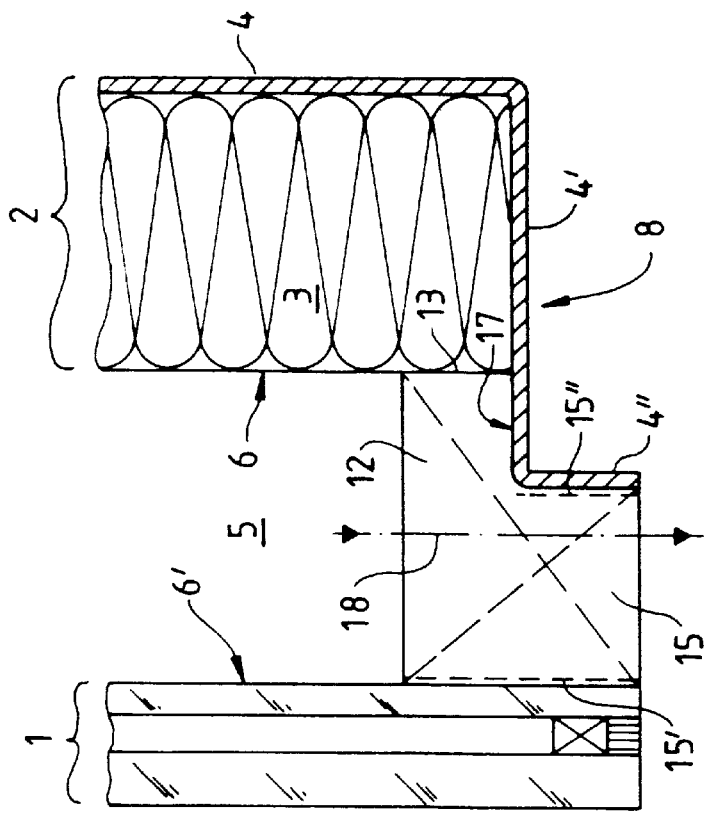
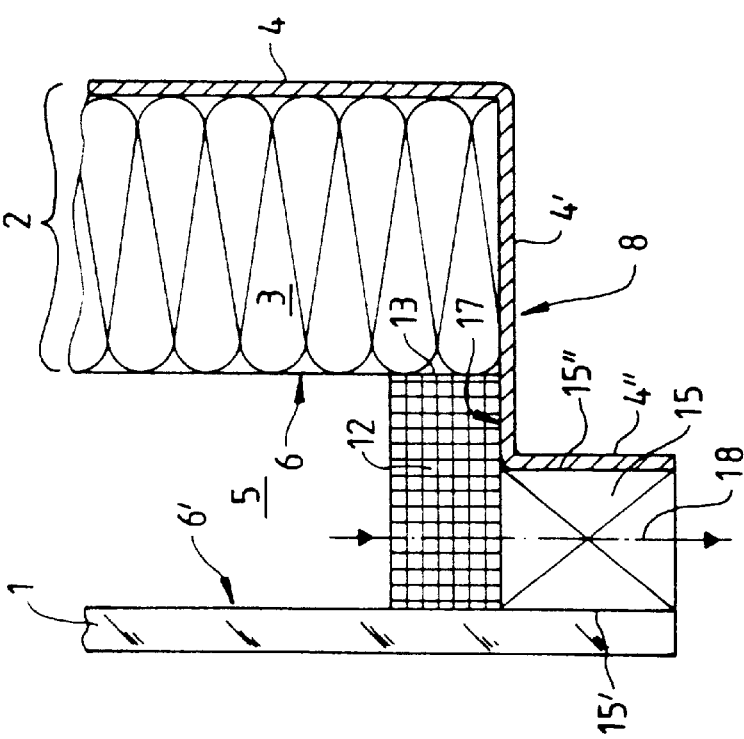

OUTER WALL ELEMENT FOR BUILDINGS

CROSS REFERENCE TO RELATED APPLICATION

This application is a national stage of PCT/DE95/01550 filed Nov. 4, 1995 and based, in turn, on German National Application 195 13 373.0 of Apr. 8, 1995 under the International Convention.

FIELD OF THE INVENTION

The invention relates to an outer wall element for buildings wherein, for the utilization of solar energy, between an inner wall shell and an outer, solar-radiation permeable wall shell, a solar-radiation permeable outer heat-insulating layer is arranged, the latter being separated from an inner heat-insulating layer along to the inner wall shell by an interface that absorbs the solar energy from the outer heat-insulating layer, and whereby at least the inner wall shell is provided with marginal lining elements, such as parts of a frame, of a panel or the like, extending at least up to the interface and conveying heat to the inner wall side.

BACKGROUND OF THE INVENTION

Outer wall elements of this kind are known from EP 0 250 691 A1. Its wall structure has the disadvantage that, due to the utilization of solar energy, high temperatures result in the outer heat-insulating layer and at the interface with the inner heat-insulating layer, which could lead to problems because of the lining elements reaching up to the inner wall shell, either in view of insufficient thermal stability of the materials or because of excessive heat conductivity through the lining elements to the interior space.

OBJECT OF THE INVENTION

It is the object of the present invention to provide an outer wall element of the kind mentioned in the introduction, so that the lining elements, especially thoses of the inner wall shell, are protected against the high temperatures reached in the inner wall structure.

SUMMARY OF THE INVENTION

According to the invention this object is achieved in an outer wall element of the type described in which the outer heat-insulating layer and the lining elements are separated from each other by insulating parts of poor heat conductivity, which starting from the lining elements cover the inner heat-insulating layer along a marginal strip in the interface.

The insulating parts provided according to the invention shield the lining elements from the high temperatures in the outer heat-insulating layer and at the interface towards the inner heat-insulating layer, so that the lining elements do not take up this high temperatures. This not only limits high heat conductivity towards the inner space, but protects lining elements, particularly frame parts which can not take the high temperatures, such as heat-insulating fillets, packing strips, etc. The marginal strip along which the insulating elements cover the inner heat-insulating layer in the interface is wide enough to prevent a heat flow from passing across the marginal strip towards the lining elements. It is however advisable to allow the insulating elements to contribute to the utilization of solar energy, and for this purpose to take steps so that the solar energy received at the absorbing interface can flow through to the wall structure on the side of the inner space, not only through the inner heat-insulating layer, but to a certain extent also through the insulating parts and the lining elements. For this purpose the heat conductivity of the insulating parts is selected so that the heat flow through the insulating parts and the lining elements towards the surfaces defining the inner space, results essentially in the same surface temperature as that of the corresponding surface of the inner wall shell.

A preferred embodiment is characterized in that the insulating parts extend marginally over the entire thickness of the outer heat-insulating layer, and besides resting on one side against the inner heat-insulating layer, also rest on the other side against the outer wall shell. In this way the insulating parts border the outer heat-insulating layer all around, thereby protecting the wall structure outside the range of the insulating parts from strong exposure to high temperatures. Suitably the surface of the insulating parts facing the outer heat-insulating layer runs obliquely with respect to the plane of the outer wall shell, so that the surface bordered by the insulating parts of the outer heat-insulating layer is larger towards the inner surface of the outer wall shell than at the interface towards the inner heat-insulating layer. The advantage of this arrangement is that the outer wall shell is covered as little as possible by the insulating parts and therefore the surface of the outer wall shell available to the passage of solar energy is minimally reduced by the insulating elements.

It is particularly advisable to make the arrangements so that the outer wall shell and the lining elements of the inner wall shell are connected by spacers, which rest against the outer wall shell on the side of the outer heat-insulating layer, and that the insulating parts are arranged between the outer heat-insulating layer and the spacers and overlap the spacers. This way the spacers are also included in the temperature protection afforded by the insulating parts. Particularly in this case the advantageous possibility of producing the spacers and the insulating parts in one piece exists.

In any case, whether the spacers and the insulating parts are produced in one piece or in several pieces, it is possible for the spacers to have a sealing profile on one side for resting against the outer wall shell, and an anchor profile on the other side, for attachment to the lining elements of the inner wall shell. Alternatively the spacers can be designed just as distance-maintaining elements and can be cemented to the lining elements, or connected with them in any other solid way.

Inasmuch as the lining elements of the inner wall shell project over the interface against the outer wall shell, in the projection zone the lining elements can serve as a support for the insulating parts.

It is also advisable to provide outward passages for pressure relief in the outer heat-insulating layer in connection with the insulating parts.

BRIEF DESCRIPTION OF THE DRAWING

The above and other objects, features, and advantages will become more readily apparent from the following description, reference being made to the accompanying drawing in which:

FIGS. 1 to 9 show various embodiments of the outer wall element of the invention, each in a cross section of the marginal area of the element; and FIGS. 10 and 11 show cross sections through the insulating parts of the embodiment according to FIG. 1, and FIG. 6, respectively in an enlarged representation.

SPECIFIC DESCRIPTION

Figure 1:
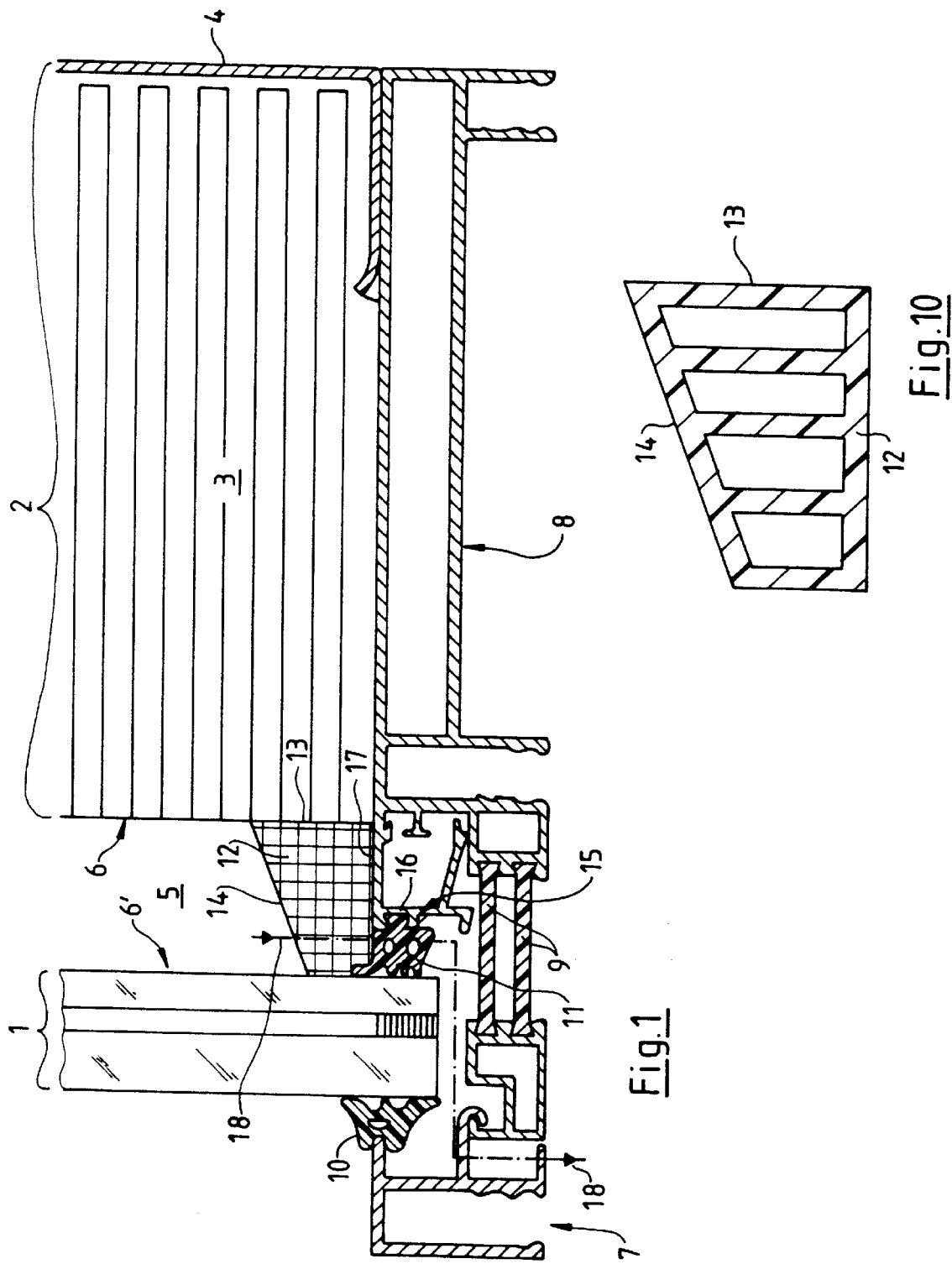
Figure 2:
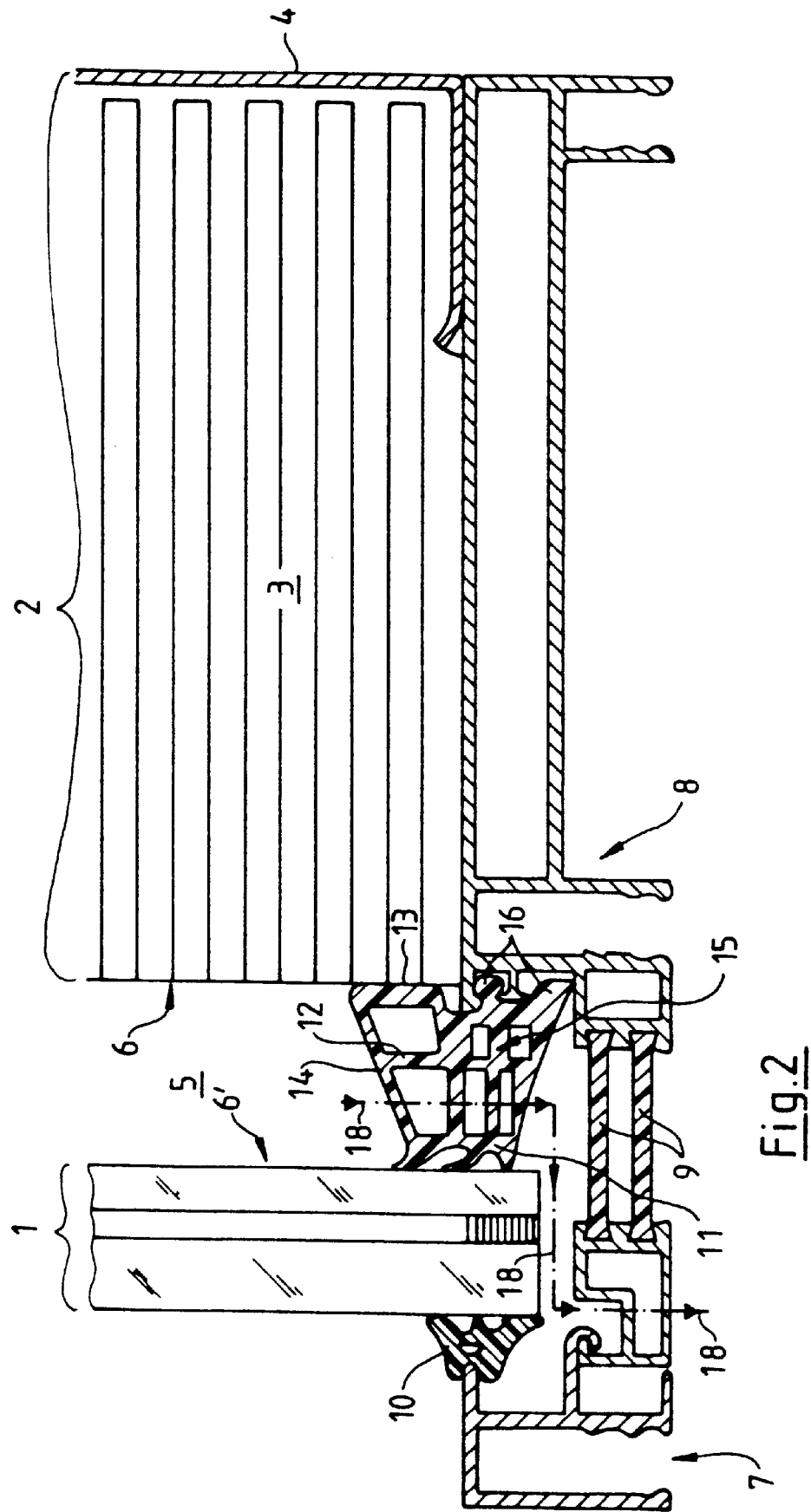

The outer wall shell is marked with 1. It can be made as a pane of fully prestressed glass (ESG) or of partially prestressed glass (TVG), as a single, double or triple pane, whereby it is also possible to provide heat-protection layers and/or sun-protection layers, as well as layers modifying the g-value (total energy transmittance), such as for instance screening layers, which do not need further description. Towards the interior space, shown in FIGS. 1–9 on the right side, the outer wall element has an inner wall shell 2 provided with an inner heat-insulating layer 3, which on the side of the inner space can be sealed off by an extensively vapor-proof wall layer 4, for instance a metal sheet, or also a concrete wall.

In the direction towards the inner space, the outer wall shell 1 is followed by an outer heat-insulating layer 5, which is also permeable to solar radiation just like the outer wall shell 1, and which in all examples is assumed to be an air layer, but can also alternately contain aerogel, glazing, transparent plastic material, capillary plates, and so on. This outer heat-insulating layer 5 is separated from the inner heat-insulating layer 3 by an interface 6, where solar radiation from the outer heat-insulating layer 5 is absorbed.

This wall structure is bounded by a lining, which can have outer lining elements 7 on the outer wall shell and lining elements 8 on the inner wall shell 2, which as a rule consist of metal and therefore conduct the heat well towards the inner space, in the Figures towards the right side. The lining can consist of a frame, such as in FIGS. 1 to 4, or of a panel, such as in FIGS. 5 to 9. When outer lining elements 7 exist (FIGS. 1–4), the lining elements 8 are connected to the former via bridging pieces 9 with poor heat conductivity. Besides the outer lining elements 7 are sealed off against the outer wall shell 1 by outer seals 10, while the inner lining elements 8 are sealed off by inner seals 11. Under the influence of solar radiation, very high temperatures result in the outer heat-insulating layer 5 and particularly in the interface 6 towards the inner heat-insulating layer 2, as well as in the interface 6' towards the outer wall shell 1. In order to shield the lining elements 8 at the inner wall shell 1 and the inner seals 11 from these high temperatures, the outer heat-insulating layer 5 and the lining elements 8 are separated from each other by insulating parts 12 with poor heat conductivity, which starting from the lining elements 8 cover the inner heat-insulating layer 5 along a marginal strip 13 of the interface 6, the marginal strip being sufficiently wide to prevent excessive heat flow from the outer heat-insulating layer 5 to the lining elements 8 of the inner wall shell 2. In particular the heat conductivity of the insulating parts 12 is selected so that the heat flow through the insulating parts 12 and through the lining elements 6 at the surface bordering the lining elements 8 towards the inner space yields substantially the same temperature as that of the corresponding surface of the inner wall shell 2, i.e. particularly of the wall layer 4. In this way the insulating parts 12 remain without influence on the utilization of solar energy.

In the embodiments illustrated the insulating parts 12 border the outer heat-insulating layer 5 all around the margins and over their entire thickness, so that the insulating parts 12 rest not only against the inner heat-insulating layer 3 on the one side, but also on the other side against the inner surface 6' of the outer wall shell 2. Thereby in FIGS. 1 to 4 the surface 14 of the insulating parts 12 facing the outer heat-insulating layer 5 runs obliquely with respect to the plane of the outer wall shell 1, namely so that the surface of the outer heat-insulating layer 5 bordered by the insulating parts 12 is greater at the inner surface 6' of the outer wall shell 1 than at the interface 6 towards the inner heat-insulating layer 3, and for this reason the surface of the outer wall shell which allow the free passage of solar radiation is minimally reduced by the insulating parts 12.

Figure 11:
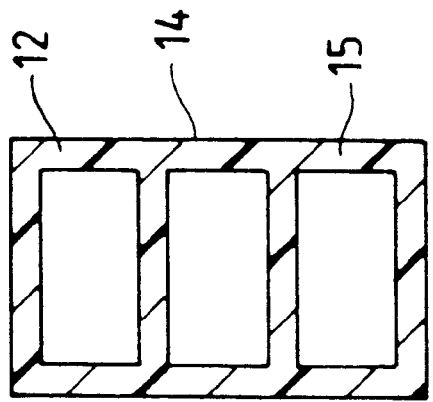
Figure 6:
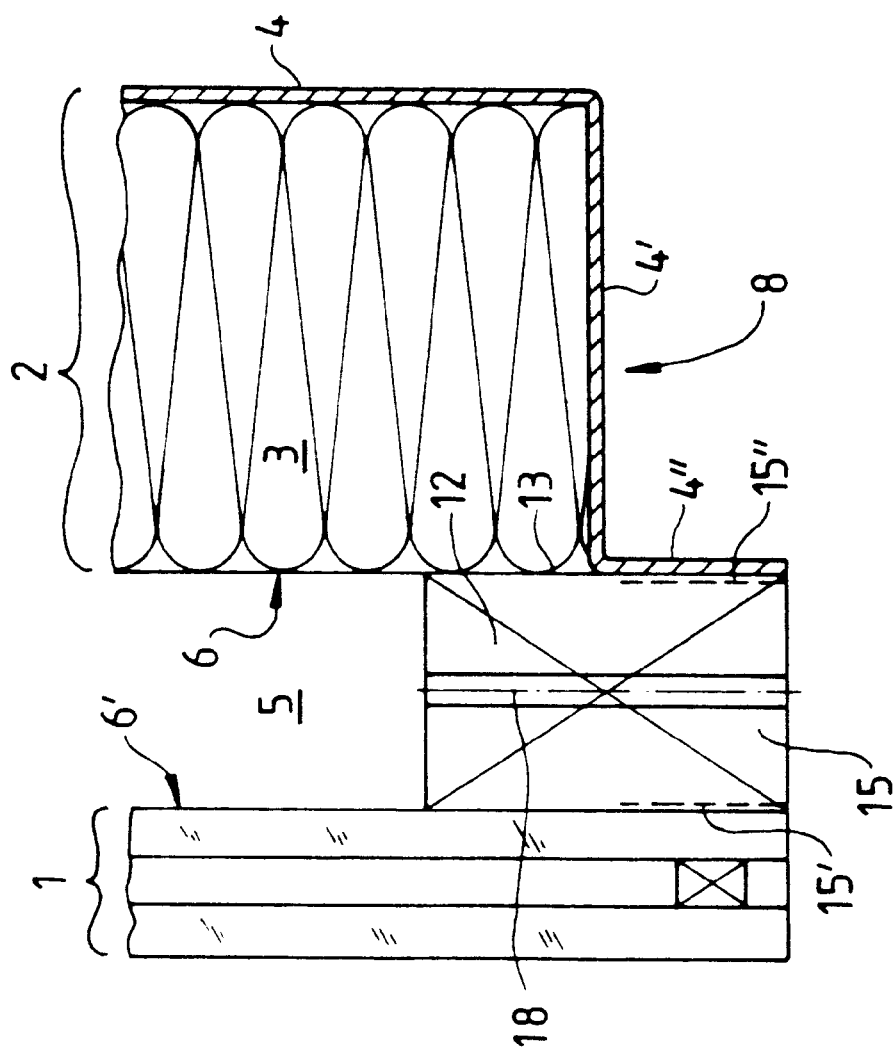

In all of the illustrated embodiments the outer wall shell 1 and the lining elements 8 of the inner wall shell are directly connected by spacers 15, which rest against the outer wall shell 1 on the side of the outer heat-insulating layer 5, whereby the insulating parts 12 are arranged between the outer heat-insulating layer 5 and these spacers 15 and cover the spacers 15, which means that they also protect the spacers 15 from excessive temperatures. The spacers 15 and the insulating parts 12 can be made in one piece, as shown in FIGS. 2, 3, 6 and 8. However the spacers 15 and the insulating parts 12 can also be separate components, as shown in FIGS. 1, 4, 5, 7 and 9. In the embodiment of FIGS. 1 to 4, the spacers 15 are provided on the one side with a sealing profile 11 for resting against the outer wall shell 1 and on the other side with an anchor profile 16 for the connection with the lining elements 8. In the embodiments of FIGS. 5 to 9 which show wall panels, the spacers are designed as distance maintaining elements, which on the one side are cemented to the outer wall shell 1 in the adhesion area 15', and on the other side are cemented to the lining elements 8 in the adhesion area 15", whereby the FIGS. 5 to 8 show panels with retracted margins, whose sheet metal flanks 4', 4" form the lining elements 8 of the inner wall shell 2. In the embodiment of a panel whose margins were not retracted according to FIG. 9, the lining elements 8 directly form the spacers 15, whereby the spacer 15, besides being cemented to the surface 15' of the inner side 6' of the outer wall shell 1, is also directly cemented to the rearward bordering plate 4 of the inner wall shell 2 at the surface 15". As far as the thickness of the inner heat-insulating layer 3 is smaller or the thickness of the outer heat-insulating layer 5 is bigger, the inner lining elements 8 of the inner wall shell 2 project over the interface 6 towards the outer wall shell 1, as seen in FIGS. 1, 3, 4, 7 and 8. The lining elements 8 can form with this projection zone a support 17 for the insulating parts 12. The insulating parts 12 can be clamped in as a frame between the outer wall shell 1 and the inner heat-insulating layer 3 and/or be cemented together with them, as well as with the projection zones 17 of the lining elements 8, or connected in other suitable ways. The insulating parts 12 can also be designed as hollow chamber profiles, as shown in FIGS. 10 and 11. In connection with the insulating parts 12 it is also advisable to take care that the outer heat-insulating layer 5 is connected to the outer space through outward passages for purposes of pressure relief, a fact which is indicated in the drawing by dot-dash line 18 (FIGS. 7 and 8). The insulating parts 12 should be made of a good heat-insulating material with sufficient thermal resistance, such as strips of mineral fiber, organic foam strips, polyurethane, strips of silicone or melamine resin foams, but also in massive or perforated form. The material can also be rigid. For the spacers 15 it is advisable to use materials such as wood, thermax polyamide, silicone.

I claim:

1. An outer wall element for a building, said outer wall element comprising:

a solar-radiation-permeable outer wall shell;

an inner wall shell spaced from said outer wall shell toward an interior of the building;

an inner heat insulating layer lying along and insulating said inner wall shell;

a solar-radiation-permeable outer heat insulating layer along said outer wall shell and having an interface with said inner heat insulating layer at which solar energy is absorbed;

marginal lining elements peripherally surrounding said shell and including:

- a metal outer lining surrounding said outer wall shell and sealed thereagainst,
- a metal inner lining surrounding said inner heat insulating layer, and bridge pieces of low thermal conductivity interconnecting said inner and outer linings; and
- an insulating member of low heat conductivity extending along said metal inner lining, around said outer heat insulating layer and in contact with said outer wall shell and said inner heat insulating layer, said insulating member covering a marginal strip of said inner heat insulating layer in contact with said metal inner lining.

2. The outer wall element as defined in claim 1 wherein said insulating member has a heat conductivity so that heat flow through said insulating member and said lining elements yields approximately the same temperature at said interface as at a surface bordering said lining elements toward said interior of the building.

3. The outer wall element as defined in claim 1 wherein said metal outer lining is sealed against a surface of said outer wall shell facing away from the interior of the building.

4. The outer wall element as defined in claim 1 wherein said insulating member has a wide side in contact with said marginal strip, a narrow side in contact with said outer wall shell and an oblique surface running from said wide side toward said narrow side.

5. The outer wall element as defined in claim 1 further comprising spacers between said metal inner lining and said outer wall shell, said insulating member covering said spacers.

6. The outer wall element as defined in claim 5 wherein said insulating member is formed in one piece with said spacers.

7. The outer wall element as defined in claim 5 wherein said spacers have a sealing profile engaging said outer wall shell and an anchor profile fitted into said metal inner lining.

8. The outer wall element as defined in claim 5 wherein said spacers are cemented to said outer wall shell and to said metal inner lining.

9. The outer wall element as defined in claim 5 wherein said metal inner lining projects outwardly beyond said interface toward said outer wall shell to form a ledge on which said insulating member is provided.

10. The outer wall element as defined in claim 1 further comprising at least one passage in said insulating member for pressure relief of said outer heat insulating layer.

\* \* \* \* \*

UNITED STATES PATENT AND TRADEMARK OFFICE
CERTIFICATE OF CORRECTION

PATENT NO: 6,012,449
DATED : 11 January 2000
INVENTORS: Harald SCHULZ It is certified that error appears in the above-identified patent and that said Letters Patent is hereby corrected as shown below:

-- In line [73] for the country of the assignee read -- Norway -- instead of "Nauru" --

Signed and Sealed this

Twenty-fourth Day of October, 2000

*Attest:*

Q. TODD DICKINSON

*Attesting Officer*      *Director of Patents and Trademarks*